W. SCHULZ.
PIPE CONNECTION.
APPLICATION FILED JUNE 16, 1911.
1,021,378.
Patented Mar. 26, 1912.
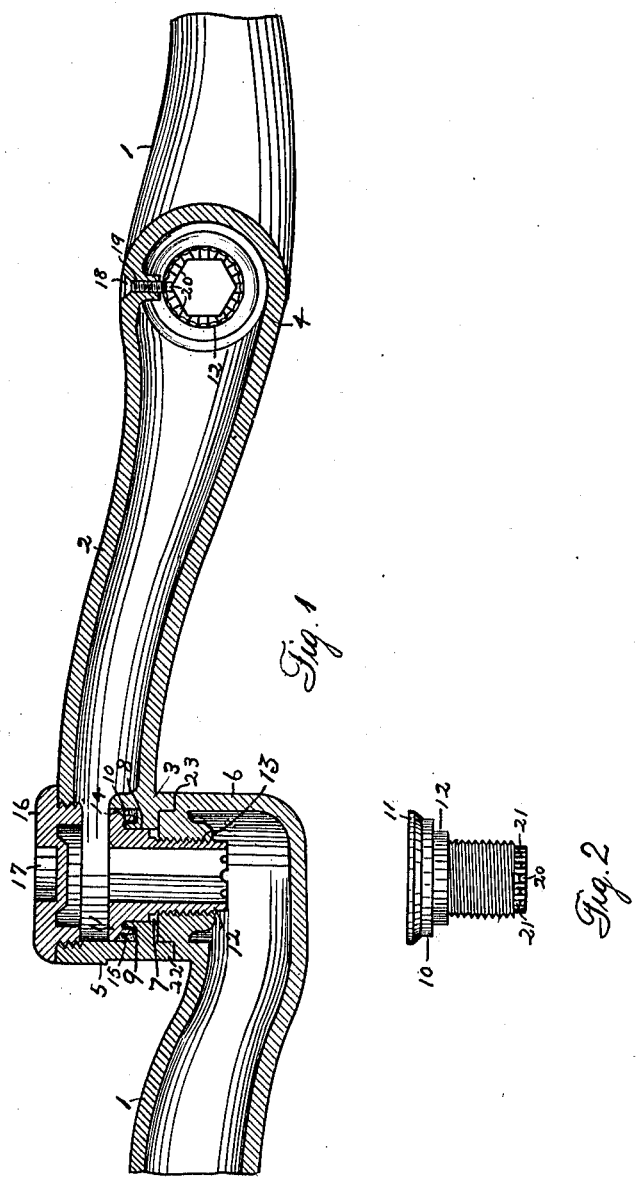

UNITED STATES PATENT OFFICE.

WILHELM SCHULZ, OF HOUSTON, TEXAS, ASSIGNOR OF FIFTY-ONE ONE-HUNDREDTHS TO HENRY H. DIXON, GEORGE M. DIXON, CHARLES M. REIN, AND R. C. DUFF.

PIPE CONNECTION.

1,021,378.  Specification of Letters Patent.  Patented Mar. 26, 1912.

Application filed June 16, 1911. Serial No. 633,557.

*To all whom it may concern:*

Be it known that I, WILHELM SCHULZ, a citizen of the United States, residing at Houston, in the county of Harris and State of Texas, have invented certain new and useful Improvements in Pipe Connections, of which the following is a specification.

My invention relates to new and useful improvements in pipe connections, and more particularly to that class of such connections as are adapted to be used to connect pipe sections composed of metal or other hard material.

The invention comprehends a plurality of pipe sections, each provided with joint members, said members being so formed as to readily unite with each other, and means for securing the union of said members.

The object of the invention is to provide a connection of the character described, which will impart flexibility to pipes, composed of a plurality of sections joined by my improved connection, irrespective of the inflexible nature of the material of which the sections of said pipe are composed; and it will be observed, that by disposing said connections, so that they will operate at varying angles to each other, a flexible pipe is provided and the prime object of the invention attained.

A further feature of the invention resides in the novel construction and arrangement of the co-acting parts of the connection, by reason of which, the pipe or hose may be moved or bent in any direction without any obstruction of the internal passageway through said pipe; and a still further and important feature of the invention resides in the construction of the connection whereby any internal pressure upon said connection outwardly operates to hold the joint members the more securely together, thereby providing a hose specially adapted to withstand great internal pressure and at the same time to be flexible. A pipe so constructed is specially adapted to be used for connecting the air pipes of railway cars and to take the place of the rubber hose connection now in common use.

Finally, the object of the invention is to provide a device of the character described, that will be easily constructed, simple, easily taken apart and united together, and one which will be efficient and easily kept in working order.

With the above and other objects in view my invention has particular relation to certain novel features of construction and operation, an example of which is given in this specification, which I do declare to be an exact, clear and complete description of my invention, reference being had to the drawing, and the numerals of designation marked thereon, which are made a part hereof, and wherein:—

Figure 1 is a longitudinal sectional view through two of said connections. Fig. 2 is a side elevation of the connecting sleeve.

Referring now more particularly to the drawings, wherein like numerals of reference designate similar parts in each of the figures, the numerals 1 and 2 designate, respectively, two pipe sections which are connected by my special form of connection. These sections are joined by suitable connections or joints 3 and 4, the joint 3 operating, preferably, at right angles to the joint 4. As the sections are formed of metal or some other suitable hard material, it is apparent that a flexible pipe is provided, and it is further obvious that the said pipe is movable in various directions, and may be formed of any desired number of sections and joints, the same being of any desired length and size.

Referring now particularly to joint 3, of Fig. 1, which is of the same construction as all of the other joints, it is to be observed that this joint is substantially cylindrical in shape, one portion or joint-member 5 being formed on the section 2 and the corresponding joint-member 6 being formed on the section 1, each joint-member being cylindrical in shape and being approximately equal in diameter to the other joint-members. The joint-member 5 is provided with a central opening 7 surrounded by a ground seat 8. This ground seat 8 is provided with an annular groove 9 in its upper face which is provided to receive a depending annular bead or flange 10 depending from the overlapping rim 11 of the sleeve 12. This sleeve 12 is cylindrical in shape and is designed to be passed snugly through the cylindrical opening 7 and is threaded at its lower end so as to engage with the thread 13 of joint member 6. A gasket 14 is provided which lines the groove 9 and surrounds the flange 10 so as to form a perfectly tight joint between said groove and flange and surrounding said flange is a spring wire 15 which fits in a shallow groove on the outside of said flange provided for the purpose, and which presses outwardly against the gasket 14, and holds said gasket tightly against the inner wall of the joint member 5. A screw threaded cap 16 is provided for permitting access to the component parts of the joint and is screwed into joint member 5 as shown in Fig. 1. This cap is provided with a suitable recess 17 for engaging with a wrench, or other instrument, which may be used in unscrewing the same, and is preferably, flat surfaced so that the joints will not be cumbersome. Each joint is provided with a set screw 18 which passes through a laterally extending tapped hole 19 in joint member 6 and the inner end of which protrudes into a suitable recess 20 in the free end of the sleeve 12. A number of recesses 20 are provided in the free end of said sleeve so that in whatever position the sleeve may be one of said recesses will be alined with the tapped hole 19 and the inner end of screw 18 will thus readily project into one of said recesses. The outer surface of the sleeve 12, at its lower or free end is grooved or corrugated with the grooves 21, as shown in Fig. 2, and in case the sleeve 12 is screwed sufficiently tight to carry the recesses 20 past the tapped hole 19 the inner end of the set screw 18 will then project into one of said grooves 21 and the sleeve 12 will thus be locked in position against turning or becoming loose.

It is to be observed that the sleeve 12 is tubular, having a passageway extending longitudinally therethrough and connecting the internal passageways of the pipe sections. It is further to be observed that the joint-members 5 and 6 are dove tailed together, one of said members having an annular shoulder or rim 22 which projects into a corresponding annular groove or recess 23 in the contacting face of the other member and this construction renders the joint tighter and less liable to disconnection. The extreme sections are designed to be attached to the usual angle cock (not shown) in any suitable manner and a complete flexible coupling is thus provided which operates for all practical purposes, the same as the flexible coupling now in common use.

A flexible pipe constructed of sections which are united by means of the connections herein set forth will be not only compact and practical but will be found to be capable of resisting great internal pressure, and will be found to be very efficient as a substitute for the rubber hose which is now in common use in railroad-car-couplings and will be found useful wherever power is to be transmitted through hose or tubing; and the joints so connected will not be so cumbersome or so liable to disconnection as the couplings now in common use.

What I claim is:—

1. In a coupling of the character described the combination with a plurality of pipe sections, of a joint member carried by each section; a tubular connecting member projecting through one of said joint members and having a threaded engagement at one end with the other of said joint members; an annular rim carried by the free end of said connecting member and a flange depending from said rim and fitting into a corresponding groove in the first mentioned joint member; a gasket surrounding said depending flange and lining said groove; an expanding ring surrounding said flange and pressing against said gasket; a means extending through a tapped hole in the last mentioned joint member and projecting into a recess in the threaded end of said connecting member; a removable cap carried by the first mentioned joint member for permitting access to the interior of said coupling, and an annular shoulder carried by one of said joint members and projecting into said corresponding recess in the other of said joint members.

2. In a coupling of the character described the combination with a plurality of pipe sections, of a joint member carried by each section; a tubular connecting member projecting through one of said joint members and having a threaded engagement at one end with the other of said joint members; an annular rim carried by the free end of said connecting member and a flange depending from said rim and fitting into a corresponding groove in the first mentioned joint member; a gasket surrounding said depending flange and lining said groove; an expanding ring surrounding said flange and pressing against said gasket a set screw extending through a tapped hole in the last mentioned joint member and projecting into a recess in the threaded end of said connecting member; a removable cap carried by the first mentioned joint member for permitting access to the interior of said coupling, and an annular shoulder carried by one of said joint members and projecting into a corresponding recess in the other of said joint members.

3. In a coupling of the character described the combination with a plurality of pipe sections, of a joint member carried by each section, a tubular connecting member projecting through one of said joint members and having a threaded engagement at one end with the other of said joint members and an annular rim carried by the other or free end of said connecting member; an annular flange depending from said rim and fitting into a corresponding groove in the first mentioned joint member; a gasket surrounding said depending flange and lining said groove; an expanding ring surrounding said flange and pressing against said gasket, said connecting member being also provided with peripheral recesses at its extreme threaded end; a set screw extending through a tapped hole in the last mentioned joint member and projecting into one of the recesses in said connecting member; a removable cap carried by the first mentioned joint member for permitting access to the interior of said coupling, and an annular shoulder carried by one of said joint members and projecting into a corresponding recess in the other of said joint members.

In testimony whereof I have signed my name to this specification in the presence of two subscribing witnesses.

WILHELM SCHULZ.

Witnesses:
 ANNIE TOMPKINS,
 EVA L. CATHEY.

Copies of this patent may be obtained for five cents each, by addressing the "Commissioner of Patents, Washington, D. C."

It is hereby certified that in Letters Patent No. 1,021,378, granted March 26, 1912, upon the application of Wilhelm Schulz, of Houston, Texas, for an improvement in "Pipe Connections," an error appears requiring correction as follows: In the grant and in the heading to the printed specification the names of the first and second assignees were erroneously written and printed as "Henry H. Dixon" and "George M. Dixon," whereas said names should have been written and printed *Henry H. Dickson* and *George M. Dickson;* and that the proper corrections have been made in the files and records of this office and are hereby made in said Letters Patent.

Signed and sealed this 14th day of May, A. D., 1912.

[SEAL.]

C. C. BILLINGS,
*Acting Commissioner of Patents.*